No. 672,536.  
J. R. NEWTON.  
CULTIVATOR DISK.  
(Application filed Oct. 24, 1900.)  
Patented Apr. 23, 1901.

(No Model.)

2 Sheets—Sheet 1.

Witnesses  
Howard D. Orr,  
J. W. Garner

J. R. Newton, Inventor,  
by C. A. Snow & Co.,  
Attorneys

THE NORRIS PETERS CO., PHOTO-LITHO., WASHINGTON, D. C.

No. 672,536. Patented Apr. 23, 1901.
J. R. NEWTON.
CULTIVATOR DISK.
(Application filed Oct. 24, 1900.)

(No Model.) 2 Sheets—Sheet 2.

Witnesses
Howard D. Orr,
J. W. Garner

J. R. Newton, Inventor,
by C. A. Snow & Co.
Attorneys

THE NORRIS PETERS CO., PHOTO-LITHO., WASHINGTON, D. C.

UNITED STATES PATENT OFFICE.

JOHN RANKIN NEWTON, OF CARTHAGE, ILLINOIS.

CULTIVATOR-DISK.

SPECIFICATION forming part of Letters Patent No. 672,536, dated April 23, 1901.

Application filed October 24, 1900. Serial No. 34,200. (No model.)

*To all whom it may concern:*

Be it known that I, JOHN RANKIN NEWTON, a citizen of the United States, residing at Carthage, in the county of Hancock and State of Illinois, have invented a new and useful Cultivator-Disk, of which the following is a specification.

My invention is an improved disk for disk harrows, cultivators, plows, and the like implements, and is an improvement on the disks described and claimed in Letters Patent of the United States No. 536,094, granted to me March 19, 1895.

The object of my present improvements is to increase the efficiency of the disk in turning over the mold and in scouring its working face to keep the same bright and prevent earth from adhering thereto and to enable me to dispense with scrapers which are commonly employed in connection with disks of this character to prevent earth from adhering thereto.

Figure 1:
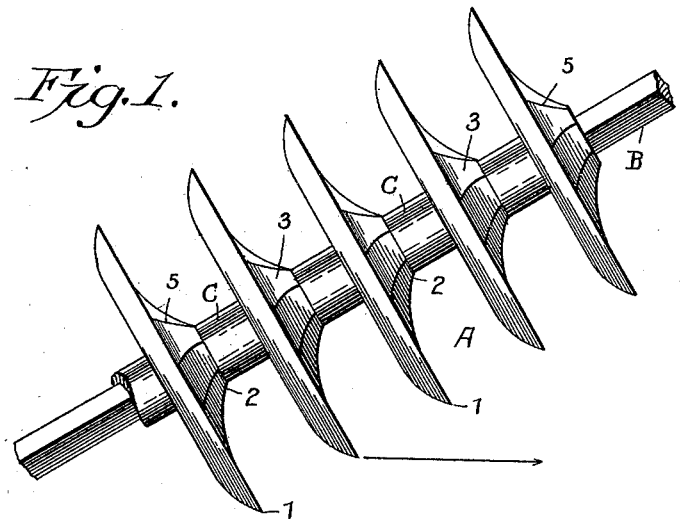
Figure 2:
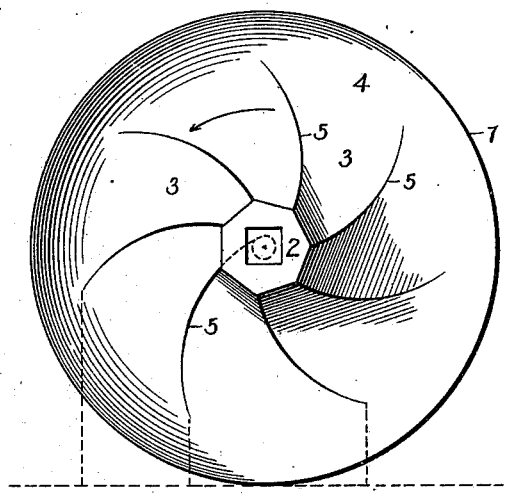
Figure 3:
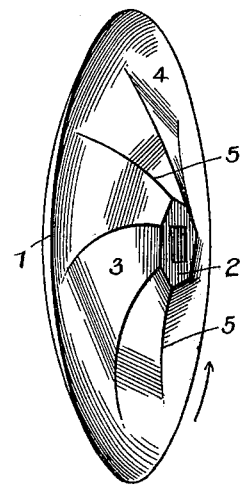
Figure 4:
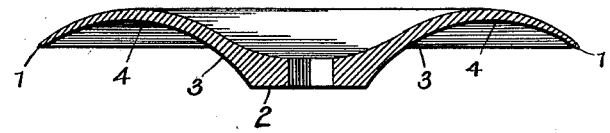
Figure 5:
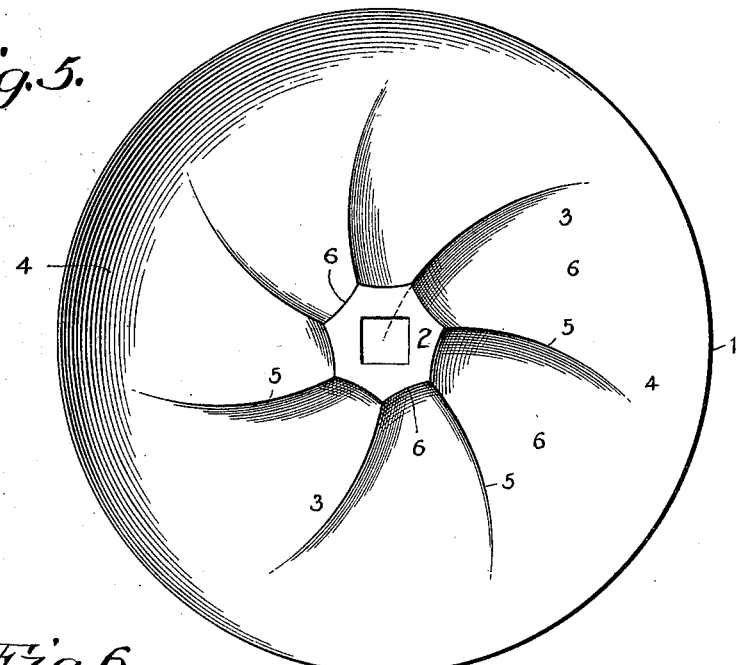
Figure 6:
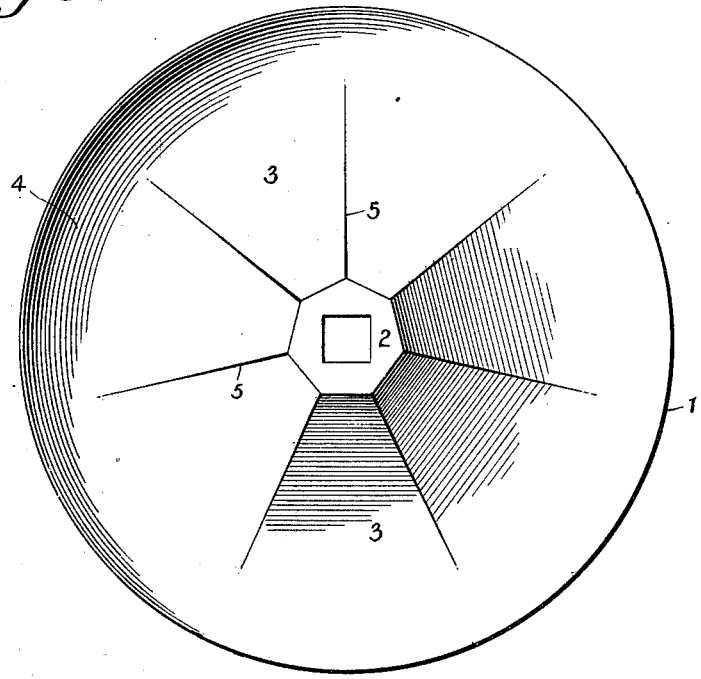

In the accompanying drawings, Figure 1 is a top plan view of a gang of disks constructed in accordance with my invention. Fig. 2 is an elevation showing the working face of one of my improved disks. Fig. 3 is a perspective view of the same. Fig. 4 is a sectional view of the same. Fig. 5 is an elevation of the working face of a disk embodying a modified form of my invention. Fig. 6 is a similar view of a disk embodying another modification of my invention.

The front or working face of my improved disk is concaved from the cutting edge 1 to the extremity of the raised central portion 2. This raised central portion or projection is of pyramidal form, the faces 3 of which merge at their outer extremities into the deepest portion 4 of the concavity of the disk. These faces may be either radial, as shown in Fig. 6, or they may be curved, as shown in Figs. 2, 3, and 5, and when thus curved the chords of the curved lines 5, which form the separating-ridges between the said faces, may be either radially disposed with relation to the center of the disk or tangentially disposed with relation thereto.

In the form of my invention shown in Figs. 2, 3, and 6 the said faces 3 are flat or plane; but in the form of my invention shown in Fig. 5 the curved faces 3 are concaved, as at 6.

In operation the cutting edge 1 of my improved disk, which is obliquely disposed with relation to the general plane of the disk, is parallel with the line of draft, as indicated by the arrow in Fig. 1, in which a gang of my cultivator-disks A is secured on a revoluble shaft B and spaced apart upon said shaft by means of the spool-shaped sleeves C.

As the cutting edge on the lower side of each disk cuts through the soil the rotation of the disk, due to the friction of the mold thereon and the oblique disposition of the disk with reference to the line of draft, causes the mold to move upward on the concaved annular portion 4 of the disk until it reaches the base of the central projection of the working face of the disk, which wedges the mold outward laterally, and the faces 3 of the said central projection increases the superficial area thereof, and each of the said faces 3 as it moves downward on the inner side of the mold increases the pressure thereon and acts torsionally on the upper edge of the mold to outcurve and roll the same downwardly, and thereby overturn the mold as effectually as the moldboard of a plow. Where the said faces 3 of the raised central projection of the disk are curved and form volutes, as shown in Figs. 2, 3, and 5, the effective areas thereof are increased in length, and hence their efficiency in overturning the mold is correspondingly increased, as will be understood, and when the said curved faces 3 of the central projection of the disk are concaved transversely, as at 6 in Fig. 5, the effective areas of the said faces are increased transversely, as will be understood, and the efficiency of the disk in overturning the mold correspondingly increased. Not only is the efficiency of the disk in overturning the mold thus increased by providing its raised central portion or projection with the faces 3, but the said faces tend to cause the disk to be more deeply buried in the soil than it would otherwise be, each of the said faces on the front engaged portion of the working face of the disk acting as a descending wedge on the inner side of the mold, the axis of which face 3, owing to the curved shape thereof and the forward movement of the disk, is vertical to the mold and of maximum penetrating power, while each of the ascending faces 3 on the rear portion of the working face of the disk exerts maximum friction on the inner side of the mold as it moves upward thereon, and thereby tends to bury the cutting edge of the disk more deeply in the soil. It will be understood, furthermore, that the faces 3 of the raised central portion of the working face of the disk tend to move the soil on involute curves toward the center of the disk and that the entire superficial area of the said faces 3 comes in contact with the soil and slides with relation thereto, so that there is no tendency of the soil to adhere to the said faces 3, and the same are at all times, when the disk is in operation, efficiently scoured, regardless of the condition of the soil, (as to the wetness or dryness thereof,) and the use of a scraper in connection with the disk to prevent earth from adhering to the working face thereof is entirely obviated.

Having thus described my invention, I claim—

1. A disk for plows, cultivators and the like, the center of the working surface of which is in the form of a pyramid having a small number of faces, substantially as described.

2. A disk for plows, cultivators and the like, having a central projection of pyramidal form on its working face, said central projection having evolute curved faces, substantially as described.

3. A disk for plows, cultivators and the like, having a central projection of pyramidal form on its working face, whereby the said central projection is provided with faces which merge at their outer extremities into the outer portion of the working face of the disk, the said faces of the said raised central portion of the disk being concaved in form, transversely, substantially as described.

4. A disk for plows, cultivators and the like, having a central projection of pyramidal form on its working face, said central projection having evolute curved faces, and said curved faces being concaved in form, transversely, substantially as described.

In testimony that I claim the foregoing as my own I have hereto affixed my signature in the presence of two witnesses.

JOHN RANKIN NEWTON.

Witnesses:
JOHN M. OWEN,
GEO. H. CALLIHAN.